United States Patent [19]

Amelung et al.

[11] Patent Number: 4,667,420
[45] Date of Patent: * May 26, 1987

[54] HURDLE FOR MALTHOUSES AND OTHER MATERIAL-HANDLING SPACES

[75] Inventors: Kurt Amelung, Denstorf; Manfred Peters, Brunswick, both of Fed. Rep. of Germany

[73] Assignee: Bühler-Miag GmbH, Brunswick, Fed. Rep. of Germany

[*] Notice: The portion of the term of this patent subsequent to Oct. 8, 2002 has been disclaimed.

[21] Appl. No.: 713,577

[22] Filed: Mar. 18, 1985

Related U.S. Application Data

[63] Continuation of Ser. No. 576,165, Aug. 24, 1983, Pat. No. 4,545,137.

[30] Foreign Application Priority Data

Apr. 9, 1982 [DE] Fed. Rep. of Germany ....... 3232977

[51] Int. Cl.$^4$ ............................................. F26B 19/00
[52] U.S. Cl. ....................................... 34/233; 34/237; 34/241; 98/55
[58] Field of Search ................. 34/179, 233, 237, 241; 98/55; 52/508, 192

[56] References Cited

U.S. PATENT DOCUMENTS

| 285,246 | 9/1883 | Filkins | 34/237 |
| 532,545 | 1/1895 | Dornfield | 34/237 |
| 2,792,644 | 5/1957 | Nelligan | 34/233 |
| 3,426,445 | 2/1969 | Steffen | 34/233 |
| 4,262,584 | 4/1981 | Dunbar | 34/233 X |
| 4,281,489 | 8/1981 | Kallestad et al. | 52/192 |
| 4,282,694 | 8/1981 | Mead | 98/55 |
| 4,545,137 | 10/1985 | Amelung et al. | 34/233 |

FOREIGN PATENT DOCUMENTS

| 2420419 | 12/1974 | Fed. Rep. of Germany | 34/241 |
| 1208603 | 12/1967 | United Kingdom | 34/237 |

Primary Examiner—Albert J. Makay
Assistant Examiner—Steven E. Warner
Attorney, Agent, or Firm—Michael J. Striker

[57] ABSTRACT

A hurdle for malthouses or other material-handling spaces has a supporting frame and a bottom supported by the supporting frame and including a plurality of hollow sheet shaped members arranged parallel closely near one another and self-supporting, a plurality of openings provided in the hollow sheet shaped members for passage of a material to be handled, and connecting elements for connecting the hollow sheet shaped members with one another.

6 Claims, 5 Drawing Figures

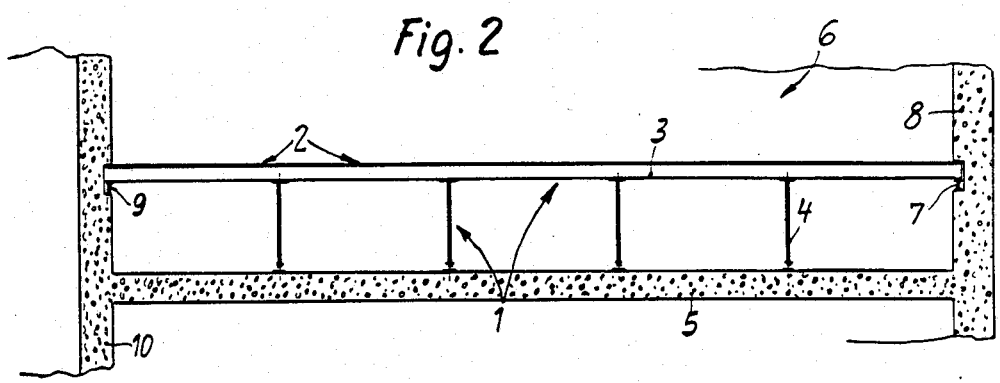
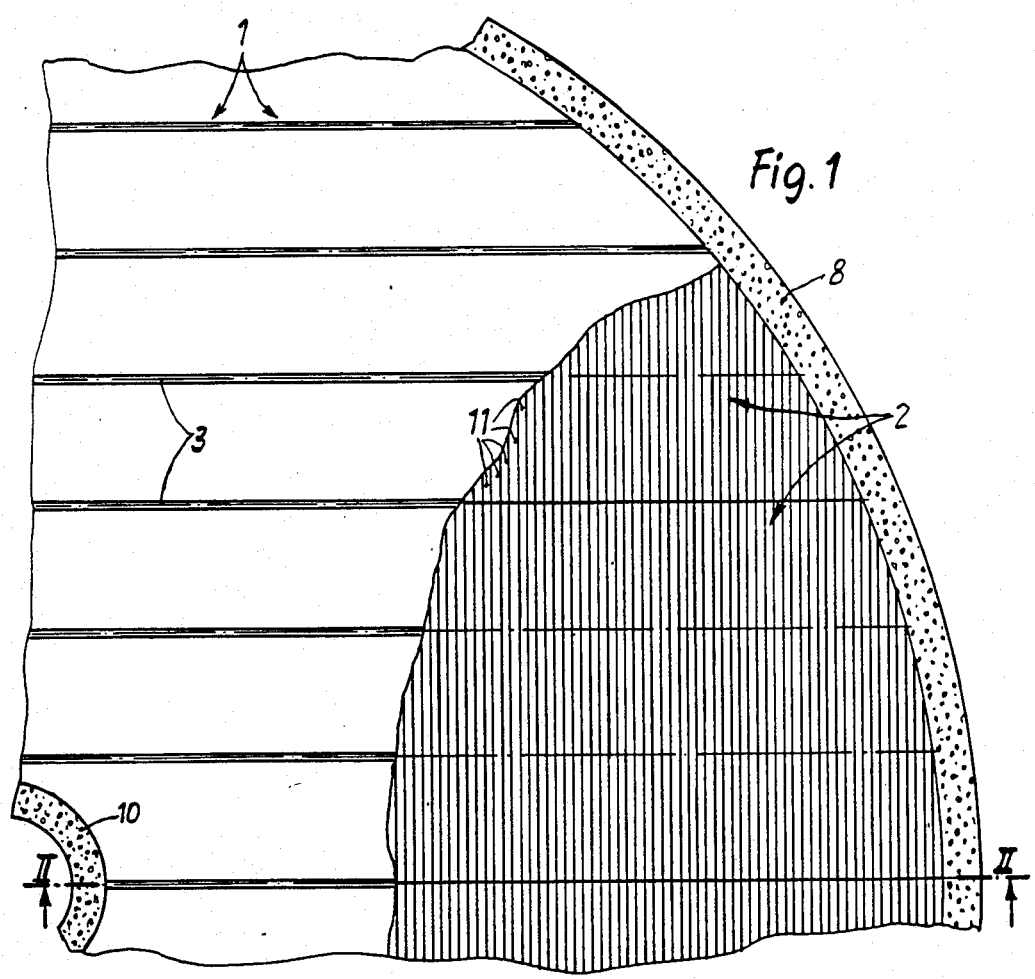

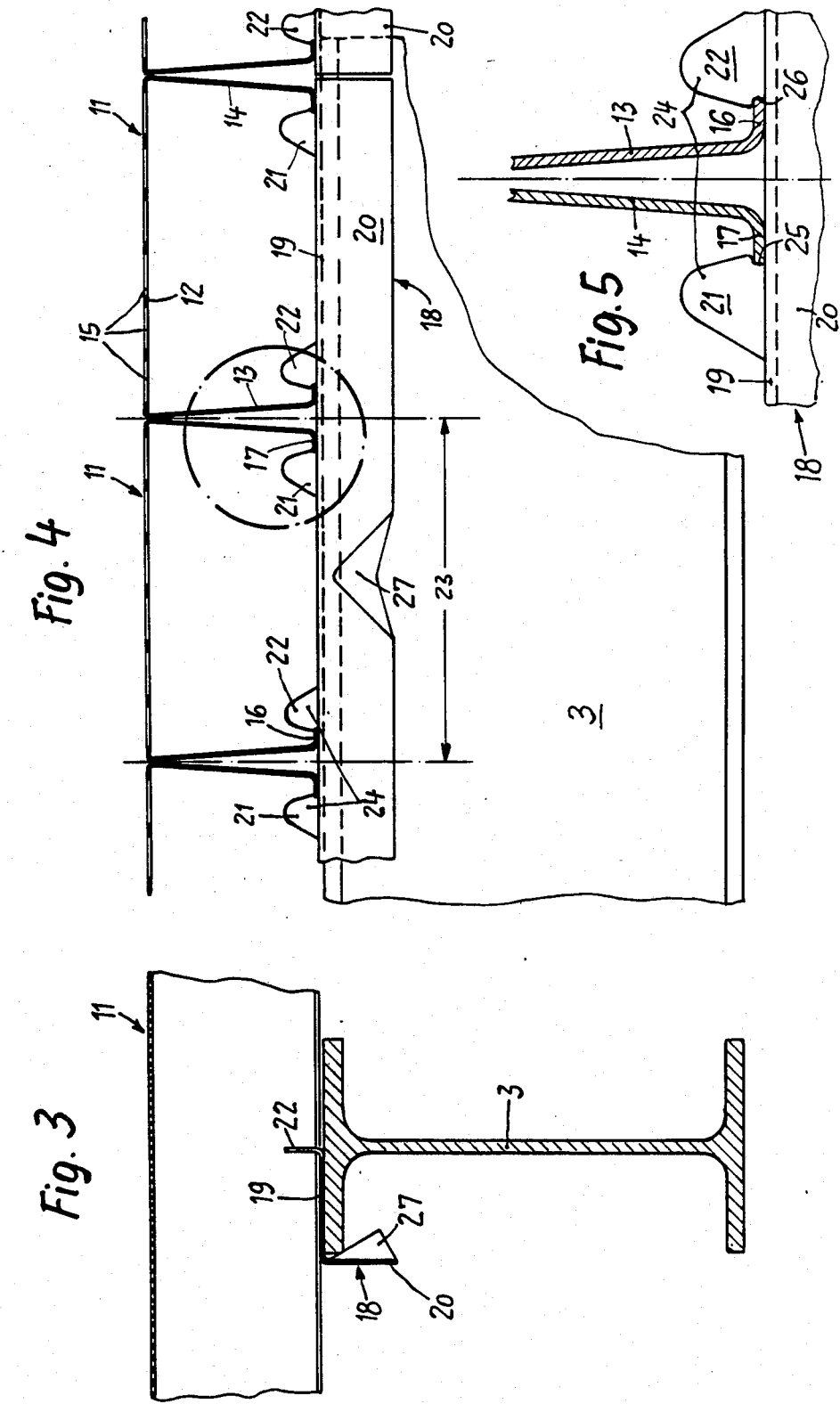

HURDLE FOR MALTHOUSES AND OTHER MATERIAL-HANDLING SPACES

This is a continuation of application Ser. No. 576,165 filed Aug. 24, 1983 now U.S. Pat. No. 4,545,137.

BACKGROUND OF THE INVENTION

The present invention relates to a hurdle for malthouses and other material-handling spaces. More particularly, it relates to a hurdle of the above mentioned type which has a supporting frame and a bottom which is supported by the supporting frame and perforated for passage of the material treating medium.

Hurdles of this type are used for wetting, germination and kiln-drying or drying of grains, hops, and other particulate products. These hurdles often have considerable dimensions and accommodate many tons of heavy particulate material, for example in modern big malt houses. They are formed either as immovable hurdles or so-called plane hurdles, or as movable hurdles such as for example tilting hurdles or rotary hurdles. All hurdles have a basic construction including a supporting frame and a bottom, wherein the supporting frame is formed as shaped or latticework supports and the bottom supported by the supporting frame is formed merely of a narrow-mesh wire network for small and simple hurdles units, or in the mainly used construction is assembled of a plurality of frames provided with apertured sheet coating. The frames have a plurality of supporting parts provided for supporting the apertured sheet coating and connected with one another in a welded construction. These bars require cutting and welding of many individual parts. Mounting of the perforated sheet coating on the frames is carried out by a riveting or welding. The first option is expensive, whereas the second option is inexpensive, but as always requires a post-adjustment of the frame, since it is warped as a result of heat expansion. The subsequent harmonization makes possible a second post-adjustment. The post-adjustments are time-consuming, since in the sense of the required planeness and shape-accuracy of the frames they must be carried out exactly because the hurdle buttons must be plane, and no essential intermediate spaces or slots must remain between the frames, which proves a danger of nests of meltable or rottable materials. The hurdle of the known construction has, because of its material-consuming and labor-consuming frames of their bottom, a high weight per meter$^2$ of hurdle surface and is expensive because of poor material use. Since the tolerances in the sense of height and maintenance of a right angle can be provided with difficulties and therefore many adjusting works and fitting works are needed in situ, the price of the square meter because of these works is negatively affected to a great extent.

SUMMARY OF THE INVENTION

Accordingly, it is an object of the present invention to provide a hurdle of the above mentioned type which avoids the disadvantages of the prior art.

More particularly, it is an object of the present invention to provide a hurdle for malthouses and other material-handling spaces in which its bottom with the same carrying capacity and the same permeability for the material treating medium has a considerably lower square meter weight and can be mounted in simpler and considerably shorter time than the known hurdle bottoms, and the subsequent adjusting and fitting works can be substantially dispensed with.

In keeping with these objects and with others which will become apparent hereinafter, one feature of the present invention resides, briefly stated, in a hurdle having a supporting frame and a bottom supported therewith, in which the bottom is formed of a plurality of hollow shaped sheet members which are arranged parallel and close to one another and are self-supporting, whereas the shaped members are provided with through openings for a material treating medium and assembled with one another by connecting means.

When the hurdle is designed in accordance with the present invention, it is possible to assemble the hurdle bottom from a plurality of hollow sheet-shaped members rolled as intermediate product to final lengths, which when necessary can be subdivided into shorter lengths and can be used without cutting. Thus the hollow sheet members can be placed on the supporting frame abutting against one another in a simple manner in rows and connected with one another in a form-locking manner with the aid of the inventive connecting means by simple pressing in a pushbutton-like manner. The inventive hurdle bottom is therefore very fast to mount, its weight is approximately a quarter of the weight of conventional hurdle bottoms, and its manufacture is price-favorable.

In accordance with another feature of the present invention, the hollow sheet shaped members are formed as downwardly open clamping shaped members. The clamping shaped members can be formed as U-shaped members with flanges extending and converging downwardly as well as provided with arresting strips at their free ends. When the hurdle is designed in accordance with these features, a spring action takes place because of the open lower side and the convergence of the flanges of the hollow sheet shaped members. This spring action is used for connecting the hollow sheet shaped members with one another, and the arresting strips additionally secure the connection by form-locking.

In accordance with a further feature of the present invention, the connecting means for the hollow sheet shaped members are formed as clamping rails lying on the supporting frame. The clamping rails can be formed as rectangular angular shaped members of sheet metal and arranged so that their one leg lies on the supporting frame and has a free end provided with upwardly extending projection pair distributed with a pitch over the length of the clamping rail corresponding to the width of the clamping shaped member. Both projections of each projection pair at their facing sides are provided with an arresting groove for receiving the arresting strip of the clamping shaped member. When the hurdle is designed according to these features, the connecting means for the hollow sheet shaped members are cost-favorable and especially easy to handle. They not only form a reliable connection for the hollow sheet shaped members, but also makes possible by step-like depressing of a leg of the clamping rail obtained after lying, to mount the latter and the hollow sheet shaped members clamped thereon on the supports of the supporting frame in a simple manner.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

BRIEF DESCRIPTION OF THE DRAWING

FIG. 1 is a view showing a cross section of a malthouse structure with a hurdle in a plan view, wherein a hurdle bottom is partially broken;

FIG. 2 is a view showing a section through the hurdle taken along line II—II in FIG. 1;

FIG. 3 is a view showing a section of a support for a supporting frame of the hurdle with a clamping rail supported thereon and a hollow sheet shaped member held by the latter, on an enlarged scale;

FIG. 4 is a partial side view of the supporting frame of FIG. 3 together with the associated clamping rail and the hollow sheet shaped member fixed thereby, also on an enlarged scale; and FIG. 5 is a view showing an enlarged fragment of FIG. 4 with the clamping rail and one of its projection pairs.

DESCRIPTION OF A PREFERRED EMBODIMENT

FIGS. 1 and 2 show as an example a hurdle for seeds of green malt having a certain circular shape. It includes a supporting frame identified with reference numeral 1 and a bottom identified with reference numeral 2.

The supporting frame 1 is composed of horizontal supports 3 having I-shape and vertical props 4 which support the supports 3 at approximately uniform distances and stand on a bottom 5 of a material-handling space 6. Each support 3 extending parallel rests with its one end on a bearing block 7 which is anchored in a recess of an outer wall of the malthouse structure. Each support 3 rests with its other end in a bearing block 9 which is fixed in a recess of a central column 10 or in another recess of the outer wall 8.

The bottom 2 of the hurdle is assembled from hollow sheet shaped members which are designed in their cross section as U-shaped clamping shaped members 11. The clamping shaped members 11 are supplied as an intermediate product with final length of for example 6 m and can be composed for example of fine steel or sheet zinc. They are arranged in narrow rows which are parallel, abut against one another and extend transverse to their longitudinal axes, on the supporting strip. Since the material-handling space 6 has a circular cross section or the outer wall 8 of the malthouse structure has a curved shape, the clamping shaped members 11 are radially outwardly cut to respective shorter lengths, as can be seen in FIG. 1.

As shown in FIGS. 3 and 4, the clamping shaped members 11 are formed as U-shaped members with a connecting web 12 provided over its entire length with rows of slots 15 for passage of germinating air. Downwardly extending flanges 13 and 14 of the clamping shaped members 11 converge and are provided at their free ends with inwardly extending arresting strips 16 and 17.

For connecting the clamping shaped members with one another, clamping rails 18 of a predetermined length, for example 1.5 m are placed transversely to the longitudinal axis of the clamping shaped members 11 on each support 3 so that they adjoin one another at their end sides. The clamping rails 18 are formed as angular shaped members with a right angle and composed of a sheet metal. Each clamping rail 18 has a horizontal leg 19 and a vertical leg 20 which reinforces the clamping rail 18 in a horizontal plane, as can be seen from FIG. 3. The clamping rails 18 lie with their leg 19 on the associated support 3 and have at the free end of this leg 19 a projection pair 24 including projection 21 and a projection 22. The projection pairs 24 extend upwardly and are distributed over the length of the clamping rails 18 in correspondence with a pitch 23 which is equal to the width of one clamping shaped member 11, as can be seen in FIG. 4.

The projections 21 and 22 of each projection pair 24 have their mutually facing sides with an arresting groove 25 or 26, as can be seen from the fragment shown in FIG. 5 on an enlarged scale and taken from the area delimited by a circle in FIG. 4. The arresting strips 17 and 16 engage in the arresting grooves 25 and 26 under the clamping action of the flanges 14 and 16 and also under the pressure applied from above during mounting against the clamping shaped member 11. As can be seen from FIGS. 4 and 5, the arresting strip 16 of the flange 13 of the clamping shaped member 11 engages in the arresting groove 26 of the projection 22 of the projection pair 24, whereas the arresting strip 17 of the flange 14 engages in the arresting groove 25 of the projection 21 of the neighboring projection pair 24.

When the clamping shaped members 11 are connected not only with one another but additionally are connected with the supports of the supporting frame, this can be provided in a simple manner so that depressions 27 are formed in the vertical leg 20 of the clamping rails 18 by striking and therefore the clamping rails 18 as well as the clamping shaped members 11 held or connected with the same in a form-locking manner can be fixed on the supports 3 and thus on the supporting frame 1. FIGS. 3 and 4 show an example of such fixing with the aid of the depressions 27.

It will be understood that each of the elements described above, or two or more together, may also find a useful application in other types of constructions differing from the types described above.

While the invention has been illustrated and described as embodied a hurdle for malthouses and other material-handling spaces, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A hurdle for malthouses and other material-handling spaces, comprising an uninterrupted supporting frame; and a bottom supported by said supporting frame and permeable for passage of a material treating medium, said bottom including a plurality of hollow sheet shaped members which extend parallel closely near one another and are self-supporting and provided with a plurality of through openings, and connecting means for connecting said hollow sheet shaped members with one another, said hollow sheet shaped members being formed as U-shaped clamping members having downwardly converging flanges with free ends and arresting strips provided at said free ends and extending inwardly toward one another, and said connecting means being arranged to clamp said arresting strips of said flanges of said members.

2. A hurdle as defined in claim 1, wherein said connecting means for said hollow sheet shaped members are formed as clamping rails supported on said supporting frame, each of said clamping rails being formed as an angular shaped member having one leg which lies on said supporting frame and has at its free end an upwardly extending projection pair arranged so that a distance between said projection pairs corresponds to the width of said clamping shaped members, each of said projection pairs including two projections provided at their inwardly facing sides with arresting grooves each receiving a respective one of said arresting strips of said clamping shaped members.

3. A hurdle as defined in claim 2, wherein each of said angular shaped members is formed with a right angle.

4. A hurdle as defined in claim 2, wherein each of said angular shaped members is composed of a metal sheet.

5. A hurdle for malthouses and other material-handling spaces, comprising an uninterrupted supporting frame; and a bottom supported by said supporting frame and permeable for passage of a material treating medium, said bottom including a plurality of hollow sheet shaped members which extend parallel closely near one another and are self-supporting and provided with a plurality of through openings, and connecting means for connecting said hollow sheet shaped members with one another, said hollow sheet shaped members being formed as U-shaped clamping members having upper horizontal parts provided with said through openings and laterally abutting against one another without gaps therebetween so as to form a completely flat upper surface which is interrupted only by said through openings, said U-shaped clamping members also having downwardly converging flanges with upper ends laterally abutting against one another and with opposite lower free ends, said U-shaped clamping members also having arresting strips provided at said free ends and extending inwardly toward one another, and said connecting means being arranged to clamp said arresting strips of said flanges of said members.

6. A hurdle as defined in claim 5, wherein said connecting means for said hollow sheet shaped members are formed as clamping rails which are arranged on said supporting frame.

* * * * *